Nov. 2, 1954  G. D. BOWER  2,693,518
THERMOSTAT

Filed Oct. 24, 1950  3 Sheets-Sheet 1

INVENTOR.
George D. Bower
BY

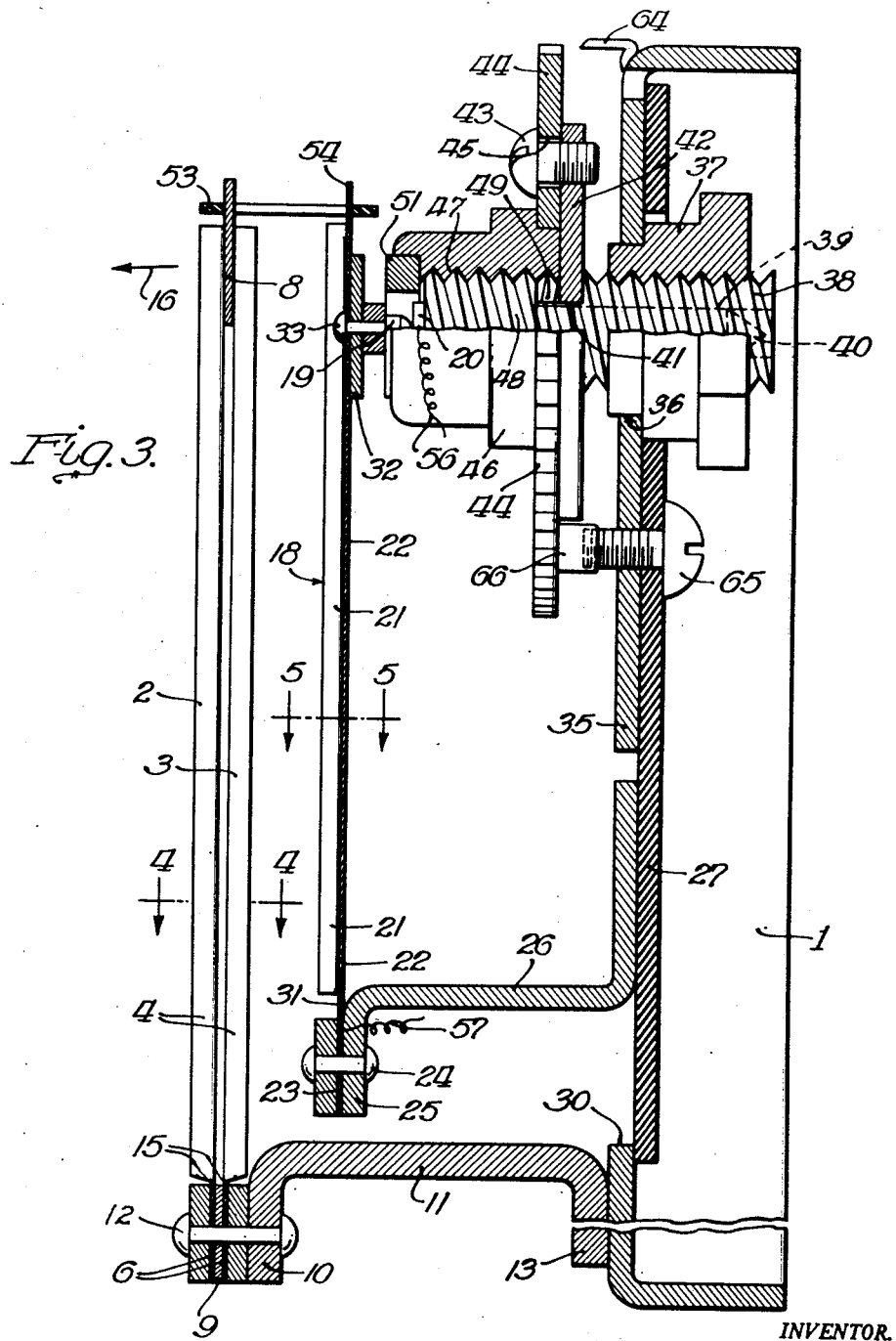

Nov. 2, 1954
G. D. BOWER
2,693,518
THERMOSTAT
Filed Oct. 24, 1950
3 Sheets-Sheet 3
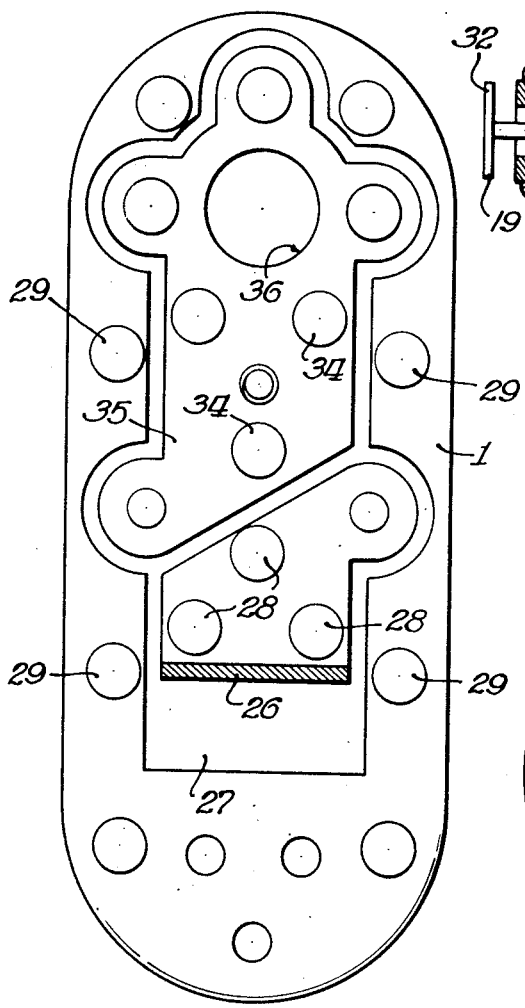
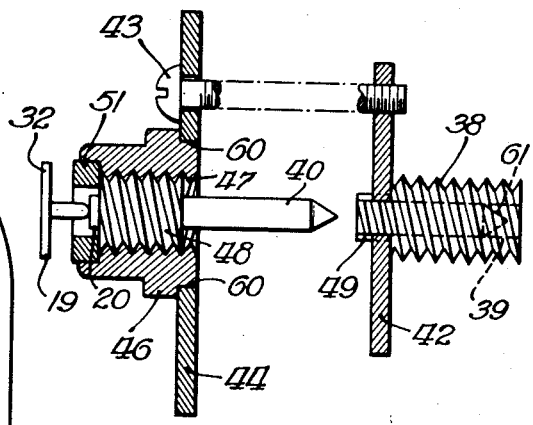
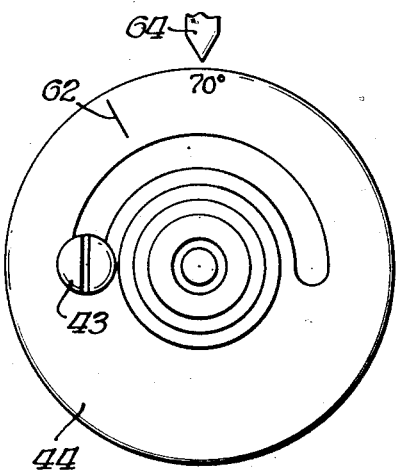
INVENTOR.
George D. Bower
BY
*Attys.*

United States Patent Office 2,693,518
Patented Nov. 2, 1954

2,693,518

THERMOSTAT

George D. Bower, Milwaukee, Wis., assignor to Milwaukee Gas Specialty Company, Milwaukee, Wis., a corporation of Wisconsin Application October 24, 1950, Serial No. 191,897

25 Claims. (Cl. 200—139)

This invention relates, in general, to thermostats, and has particular relation to thermostats of the type which comprise thermostat elements having different coefficients of expansion.

While the particular device which I shall describe hereinafter in connection with the drawings is adapted for use for regulating automatically the temperature produced by a heating apparatus, and, more particularly, for maintaining the temperature of a room or other space at a definite degree, it is to be understood that the device may be used for controlling other devices or for making, breaking, or changing the connections in one or more electric circuits for heaters or other devices as suitable or desired.

The present invention may be more particularly characterized as relating to thermostats of the character disclosed and claimed in the copending application of Gifford I. Holmes, Serial No. 187,539, filed September 29, 1950.

In prior practice, thermostats of the bimetallic type have commonly comprised strips of different metals welded or brazed together, and operated by distortion of such strips caused by unequal expansion of the metals with increase in temperature. The manufacture of such thermostats has involved hot rolling and pressing operations which have been complicated and expensive and have required considerable skill. Moreover, it has been necessary to make such thermostats relatively long to provide the desired action. Their mass has been relatively large, and they have not been as small, compact, and sensitive as may be desired.

One of the main objects of the present invention is to provide an improved thermostat which will overcome shortcomings of prior bimetallic thermostats, and, more particularly, a thermostat wherein the active thermostat elements may be shorter than the usual prior art bimetal elements; also of less mass and higher action, and of smaller, more compact and more sensitive character.

Another object of the invention is to provide a thermostat in which the active elements do not change relationship substantially under varying temperatures; more particularly, a thermostat in which the active elements have hinge portions and beam sections which remain substantially parallel to each other and do not curve notwithstanding flexing of the elements at the hinge portions.

Another and more specific object of the invention is to provide a thermostat in which the active elements are joined in spaced relation and shaped as beam sections, and have flexible hinge portions.

Another object of the invention is to provide a thermostat in which the hinge portions of the active elements are disposed adjacent one of the locations where the elements are joined in spaced relation.

Another object of the invention is to provide a thermostat in which the spaced active elements, shaped as beam sections and having flexible portions, may operate either in compression or tension.

Another object of the invention is to provide a thermostat in which the portions of the spaced active elements, which are shaped as beam sections, move about the hinge portions by differential elongation and shortening of the active elements upon a rise and drop in temperature.

Another object of the invention is to provide a thermostat in which the spaced active elements, shaped as beam sections and having flexible hinge portions, may be stamped from sheet or strip stock and joined in spaced relation without hot rolling or pressing operations; also active elements of the character described which may be similarly formed to permit use, for example, of the same stamping or forming means for the different active elements.

Another object of the invention is to enable making the active elements of different sensitive metals, alloys, or other materials having good strength and high coefficients of thermoexpansion; also to enable the use of active elements having different coefficients of expansion combined with generally similar moduli of elasticity.

Another object of the invention is to provide a thermostat in which the active elements may be spaced differently to provide different sensitivities and different output forces for a given change in temperature.

Another object of the invention is to eliminate shear forces such as are present in bimetal thermostats where the neutral axis is welded, whereby to enable a further reduction in size of the thermostat.

Another object of the invention is to enable the use of highly stressed and extremely thin active elements further to increase the sensitivity of the device.

Another object of the invention is to provide an improved actuator for actuating a controlled device from one position to another position by the operation of the active thermostat elements upon a rise in temperature, and, more particularly, an improved actuator for actuating a switch arm to open circuit position upon a rise in temperature, and wherein stresses will not be imposed on parts of the device, for example, when the active thermostat elements are exposed to relatively low temperatures, as in shipment.

Another object of the invention is to provide improved calibrating and adjustment means for the thermostat; also a device in which, for example, the separation of contacts by the operation of the thermostat will be with a snap action.

Further objects and advantages and numerous adaptations of the invention will appear from the following detailed description, taken in connection with the accompanying drawings.

In the drawings:

Figure 3 is a vertical sectional view taken on the line 3—3 of Figure 2;

Figure 6 is a front elevational view of the base of the device showing the attachment of the insulating back plate and other mounting members thereto;

Figure 7 is an exploded view showing the association of the thermostat calibrating and adjusting parts of the device; and Figure 8 is a front elevational view of the dial and associated parts as shown in Figure 7.

Figure 1:
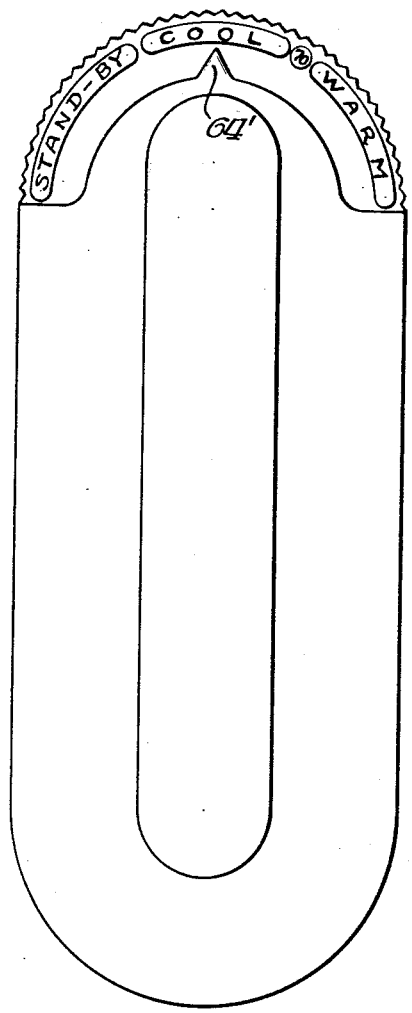
Figure 1 is a front elevational view of one form of device embodying the present invention.

Referring now to the drawings, the particular embodiment of the invention selected for illustration comprises a base 1 which may be mounted, for example, upon a wall or other support.

In actual practice, the device according to the present invention may be about 3¾ inches long (i. e., from top to bottom as shown in Figure 1) and about 1½ inches wide. The present invention is not, of course, limited to particular dimensions. They are mentioned to illustrate the small and compact character of the device.

Figures 4, 5:
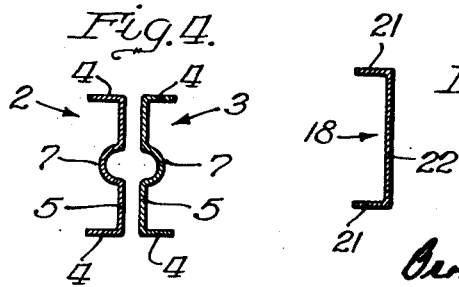
Figure 4 is a detail section taken on the line 4—4 of Figure 3.
Figure 5 is a detail section taken on the line 5—5 of Figure 3.

The active elements 2 and 3 of the thermostat are shaped as beam sections, and, by such construction, can operate either in compression or tension. As best shown in Figure 4, the beam sections selected for illustration are of longitudinally extending generally channel form having angular longitudinally extending marginal flanges 4 and a connecting web 5. The connecting web 5 of each element 2 and 3 extends at 6 beyond the ends of the flanges 4 at one end of the thermostat (i. e., at the lower end as the device is shown in Figure 3). Further to stiffen the active elements 2 and 3, each of these elements is of hat-shaped section or provided with creases 7 extending longitudinally along the medial portions of the elements 2 and 3.

The elements 2 and 3 are arranged back to back as shown in Figure 4, and, with the absence of flanges 4 and creases 7 along the extending ends 6 of the webs 5, these extending webs 6 are flexible and constitute a flexible hinge for the active elements 2 and 3 as will presently appear.

The outer or upper ends of the elements 2 and 3 as the device is shown in Figure 3 are spaced apart by a spacer 8 rigidly fixed between the webs 5 of the elements 2 and 3. The inner or lower ends of the elements 2 and 3 are spaced apart by a spacer 9 rigidly fixed between the extending ends 6 of the webs 5. The spacers 8 and 9 may be of the same thickness to provide equal spacing of the active elements 2 and 3 throughout their longitudinal extent. The elements 2 and 3 may be rigidly joined at the spacers 8 and 9, and the spacers may be rigidly secured in place between the active elements by welding, brazing, soldering, screwing or riveting them together, or in any other suitable or desired manner.

The elements 2 and 3 may be formed of any suitable or preferred metals, alloys or other thermostat materials having different coefficients of expansion. Thermosensitive metals having good strength and high coefficients of expansion are preferably employed. As an example and without limiting the invention thereto, the active element 2 may be formed of Invar which is a ferro-nickel alloy, or of other low expansion metal, and the element 3 may be formed of aluminum, or brass, or preferably a stainless steel of the #300 Series, such as #302 stainless steel. Inasmuch as the elements 2 and 3 are not limited to being welded or brazed together but may be mechanically secured at their ends or other spaced locations, the Invar element 2 may be associated with an element 3 of aluminum or brass or, preferably, stainless steel which has a coefficient of expansion corresponding to some brasses, and therefore different from the coefficient of expansion of the Invar element. At the same time the stainless steel element has a modulus of elasticity similar to Invar.

The spaced extending ends 6 of the webs 5 are secured with the spacer 9 therebetween, for example, to a flange 10 at the outer end of a bracket 11, for example, by a rivet 12 or by a screw, or by welding, soldering, brazing, or otherwise as desired. The inner end of the bracket 11 has, for example, another flange 13 secured to the base 1.

The angular flanges 4 and creases 7 of the beam sections of the active elements 2 and 3 terminate short of the attachment of the elements 2 and 3 to the bracket 11 to form the hinge 15 about which the elements rotate or move in the operation of the thermostat. As the temperature of the room or other space or other temperature affecting the elements 2 and 3 rises, the element 3 elongates, whereby the elements 2 and 3 assume different lengths to cause rotation or movement of the elements 2 and 3 in the direction of the arrow 16 (Figure 3) about the hinge 15. Upon a drop in temperature the element 3 contracts or shortens differentially relative to the element 2, and the elements rotate or move about the hinge 15 in the opposite direction.

The active elements 2 and 3 may be stamped from sheet or strip stock and are joined in spaced relation without hot rolling or pressing operations. Moreover, the active elements may be similarly formed and shaped to permit use, for example, of the same stamping or forming means for the different active elements 2 and 3.

In the manufacture of thermostats embodying the present invention, it is contemplated to provide different spacings between the active elements 2 and 3 and to join these elements in their different spaced relations to provide different sensitivities and different output forces for a given change in temperature.

The active elements 2 and 3 of the present invention may be shorter than the usual prior art bimetal elements; also of smaller, more compact, and more sensitive character. While the present invention is not limited thereto, it has been found by experiments with sensitive elements of Invar and #302 stainless steel of .005 of an inch thickness spaced .020 of an inch apart, and 2½ inches long that an operating differential of approximately one-half of a degree F. is obtained at 3 grams contact pressure. It is contemplated that the spaced metals thermostat of the present invention will be projected to thermostats which may be totally enclosed, so that even thinner and, hence, more thermally sensitive elements may be employed.

The similarly formed spaced metals permits of a shorter element than bimetal for the reason that the main axis formed, for example, by the invar element with an expansible element has no shear forces therein as in the case of a bimetal thermostat where the neutral axis is welded. This enables further reduction in size of the thermostat and, as a result, an exceedingly compact device is provided.

The use of highly stressed and extremely thin elements is permitted, and this further increases the sensitivity of the device. Moreover, neither element need be made of more metal than the other element to allow for a difference to which one metal will roll down as compared with the other metal, as in bimetal thermostats where the metals are hot rolled and pressed to braze or weld them together.

The mounting tang or flange 10 may, if desired, be of a character to be turned or twisted with a pair of pliers or other suitable tool to get the end of the thermostat properly located.

In the illustrated embodiment of the invention, the device under control of the active thermostat elements 2 and 3 is shown in the form of a switch comprising a contact arm 18 which carries a contact 19 for movement into and out of contact with a contact 20.

The contact arm 18 is preferably of channel section as shown in Figure 5 having angular, longitudinally extending marginal flanges 21 and a connecting web 22. The connecting web 22 extends at 23 beyond the lower ends of flanges 21 and is secured, for example, by a rivet 24, or by bolting, welding, soldering, brazing or otherwise to a flange 25 on a bracket 26 which is fastened to an insulating plate 27, for example by rivets 28. The plate 27 is secured, for example, by rivets 29 to the base 1 over a window or opening 30 therein. The flanges 21, which throughout their length stiffen the contact arm 18, terminate short of the attachment of arm 18 to the flange 25 and the depending web 23 is flexible so that the arm 18 flexes only around the hinge at 31.

The contact arm 18 also carries an armature 32. The armature 32 and contact 19 may be rigidly secured to the arm 18, for example, by a rivet 33 or otherwise as desired.

The insulating plate or panel 27 also has fastened thereto, as by rivets 34, a plate 35 which has a hole 36 to receive a hub 37. The hub 37 is threaded inside to receive a screw 38. The screw 38 has a smooth axial hole 39 therethrough to receive a pin 40, which pin is soldered or otherwise fixedly secured in the hole 39. The screw 38 has splined thereto at 41 a rotatable plate 42 which carries a screw 43 that can frictionally engage an adjustment dial 44. The shank of the screw 43 extends through an arcuate slot 45 in the dial 44.

The dial 44 is secured to a hub 46 that is threaded at its inside, as at 47, and has screwed engagement with a screw 48 which is integral with the pin 40. When the pin 40 is soldered into the hole 39, the screws 38 and 48 become a unitary structure but leave a space 49 for movement of the plate 42 along its splines 41. The screw 43, when loosened, is adapted to move in the direction of the arrow 50 (Figure 2) in the slot 45 in the adjustment dial 44.

Figure 2:
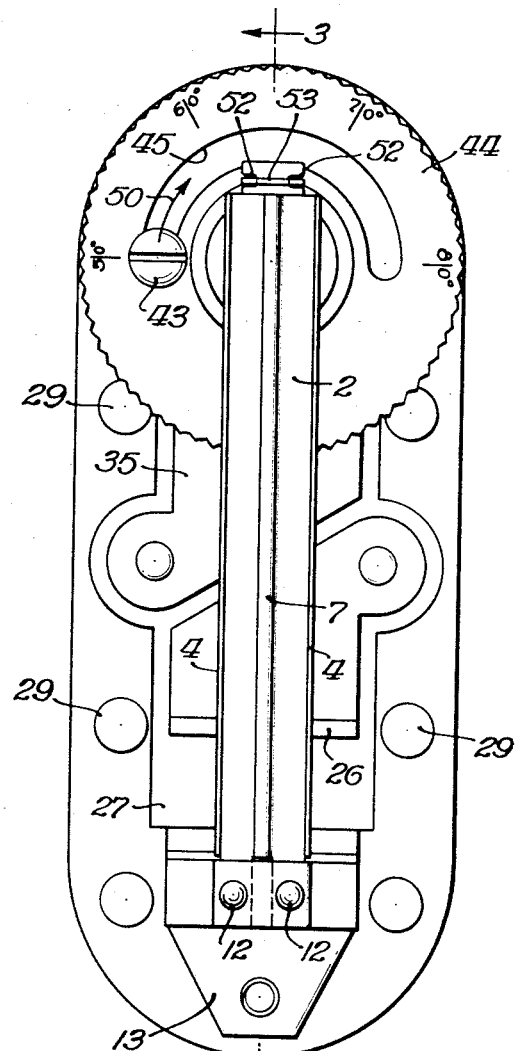
Figure 2 is a front elevational view of the device with the front cover removed.

The screw 43 in Figure 2 is shown in the minimum differential position, and likewise is in such position in Figure 3. With the dial 44 held in the position shown in Figure 2 the screw can be loosened and pushed or moved in the direction of the arrow 50 in the slot 45. This will effect turning of the plate 42 and screw 48 so that the contact 20, which is fixedly secured to the outer end of the screw 48, will move toward the right as the device is shown in Figure 3. This brings the magnet 51, which is fixedly secured in the outer end of the hub 46, and the armature 32 closer to each other. This widens the differential or the energy which must be stored in the active thermostat elements 2 and 3 before they can overcome the magnetic attraction between the magnet 51 and the armature 32 to effect movement of the contact 19 away from the contact 20 by action of the thermostat elements 2 and 3 in the direction of the arrow 16 (Figure 3), as will presently appear.

For the purpose of moving the contact 19 away from the contact 20 by action of the thermostat elements 2 and 3 in the direction of the arrow 16 (Figure 3), the spacer 8, for example, extends upwardly above the flanges 4 and is notched or cut away at 52 to receive a looped insulating link 53. The looped link 53 is also looped around an upward extension 54 as shown in Figure 3. The link 53 thus constitutes an actuator for swinging arm 18 to the left and contact 19 away from contact 18 by rotation or movement of thermostat elements 2 and 3 in the direction of the arrow 16 about their hinge 15. At the same time the active elements 2 and 3 can move in the opposite direction free of the contact arm 18, for example, where the active elements are exposed to relatively low temperatures, as in shipment. Therefore objectionable stresses will not be imposed on the parts under such conditions.

The contact 19, or both contacts 19 and 20, may be formed of silver or other suitable contact material. It will be noted that the contact 20 is disposed within the ring-shaped magnet 51 and is thus shielded by the magnet.

Conductors 56 and 57 are connected one to contact 20 and the other to contact 19, for example, through contact arm 18 as shown diagrammatically in Figure 3. Where the thermostat is used, for example, for regulating automatically the temperature produced by heating apparatus, and more particularly for maintaining the temperature of a room or other space, the conductors 56 and 57 may connect, for example, an electroresponsive valve in the gas or other fuel supply line to a source of electric power (not shown) so that when the contacts 19 and 20 are in contact the valve will be energized and opened, and retained in open position for the supply of fuel to the burner. When contact 19 is separated from contact 20 the circuit is opened and the valve moves to closed position to shut off the supply of fuel to the burner. These aspects are merely illustrative. The thermostat may also be used in connection with other systems, or for controlling any electric circuit, or elsewhere as suitable or desired.

In the operation of the device, when the temperature affecting the active elements 2 and 3 of the thermostat rises above the temperature for which the device is set—for example, 70° F.—the element 3 elongates whereby elements 2 and 3 assume different lengths to cause rotation or movement of the active elements 2 and 3 in the direction of the arrow 16 (Figure 3) about the hinge 15. The accompanying movement of the link 53 and its cooperation with the contact arm 18 pulls the contact arm to the left (Figure 3) about its hinge 31, and because of the attraction of the magnet 51 for the armature 32 the contact 19 is separated from the contact 20 with a snap action.

Upon a drop in temperature the element 3 shortens more than the element 2, and these elements are caused to rotate or move in the opposite direction about their hinge 15. As a result, the contact arm 18 moves in the opposite direction, for example, under the magnetic attraction of the magnet 51 for the armature 30, and the contact 19 moves into contact with the contact 20. The separation of the contact 19 from the contact 20 shuts off the heating action, for example, by shutting off the flow of fuel to the burner, and the contact of contact 19 with contact 20 starts the heating action, for example, by establishing a flow of fuel to the burner.

The active elements 2 and 3 may be highly stressed, with the stresses concentrated at the hinge 15. In existing bimetal thermostats a differential of about 3° may be obtained without heat anticipation. With the device of the present invention it has been found that a differential of less than 1° is obtainable, particularly with low contact pressures of approximately 3 to 6 grams.

To further show the association of the part in Figure 3, exploded view (Figure 7) has been provided. In the position shown, the screw 48 has been screwed in as far as possible so that its left hand end just touches the magnet 51, which is the minimum differential position in which the armature 32 is very little affected by the pull of the magnet 51. The hub 46 is engaged by the dial 44 for non-rotation by staking at 60. The pin 40 may then be inserted into the hole 39 running through the screw 38 and soldered in place as at 61. Such structure will result in a substantially integral screw comprising screw portions 38 and 48 which are restrained to rotate together because of the solder 61, and will leave a splined space 49 which permits of axial movement of the adjusting plate 42.

Hence to adjust the device in this position the thermostat may be kept, for example, for 24 hours in a 70° F. atmosphere. Then the dial 44 will be rotated to such an extent that contacts 19 and 20 just make contact. This may leave the dial 44 in any position at this time. In this position the screw 43 may be loose and thereafter rotated or moved, as previously described, to move the armature 32 closer to the magnet 51 to provide for proper contact pressure and differential. This may be a force of 3 grams contact pressure, for example, and will result in approximately ½° F. operating differential at such contact pressure. The screw 43 is then tightened, and a mark may be placed on the dial 44, such as shown at 62 in Figure 7.

After the temperature adjustment is made, the hub 37 may be rotated in the hole 36 in which it is frictionally engaged to such an extent that a special wrench should be required for this adjustment to an extent that the temperature marking 70° on the dial registers with a pointer knob 64'. Thereafter a screw 65 which has been backed away, as shown in dotted lines, is turned home and cooperates with a pair of small stop brackets 66 that may be secured to the dial 44. As shown in Figure 1 a pointer 64 is provided, for example, on the cover for cooperation with the temperature markings on the front of the dial 44.

Another and possibly better adjustment would be to rotate the back screw or hub 37 around to 70° reading on the dial, with the other parts in the position described, and move the dial back and forth so that the thermostat closes at the 70° setting.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. A thermostat comprising a pair of active elements of substantially equal length and coextensive, said elements having different coefficients of expansion and each of channel-shaped configuration with side flanges and a connecting web, the connecting webs of said elements projecting beyond the ends of the side flanges at one end of the thermostat to form fixedly mounted flexible hinge portions about which said elements are swingable in opposite directions, and the connecting webs of said elements having creases extending longitudinally between said side flanges and terminating at the inner ends of the flexible projecting hinge portions of said webs.

2. A thermostat according to claim 1 wherein the active elements are spaced and out of direct contact throughout their entire extents.

3. A thermostat according to claim 1 wherein the channel sections of the active elements are disposed back to back.

4. A thermostat according to claim 1 wherein the active elements are disposed back to back and spaced and held out of direct contact throughout their entire extents by a first spacer interposed between the flexible projecting hinge portions at one end of the thermostat and a second spacer of thickness corresponding to the thickness of said first spacer and interposed between the connecting webs of the active elements at the opposite end of the thermostat.

5. A thermostat according to claim 1 wherein there is a bracket having an angular flange to which the flexible projecting hinge portions of the webs of the active elements are fixedly secured, said flange being movable to different positions to adjust the location of the thermostat.

6. A thermostat according to claim 1 wherein there is a controlled device and an actuator connecting the active elements and said controlled device for movement of the controlled device with the active elements in one direction, said active elements being free of the controlled device through a portion of the range of movement of said active elements in the opposite direction.

7. A thermostat according to claim 1 wherein the active elements have different coefficients of expansion combined with matching moduli of elasticity.

8. A thermostat comprising a pair of active elements of substantially equal length and coextensive, said elements having different coefficients of expansion and each of channel-shaped configuration with side flanges and connecting web, the connecting webs of said elements projecting beyond the ends of the side flanges at one end of the thermostat to form fixedly mounted flexible hinge portions about which said elements are swingable in opposite directions, the connecting webs of said elements having creases extending longitudinally between said side flanges and terminating at the inner ends of the flexible projecting hinge portions of said webs, said active elements being disposed back to back and spaced and held out of direct contact through their entire extents by a first spacer interposed between the flexible projecting hinge portions at one end of the thermostat and a second spacer of thickness corresponding to the thickness of said first spacer and interposed between the connecting webs of the active elements at the opposite end of the thermostat, said second spacer projecting from the adjacent ends of the active elements, a contact arm having a contact carrying portion of channel-shaped configuration with side flanges and connecting web, the connecting web of said contact arm projecting beyond the side flanges at each of the opposite ends of said arm to form a fixedly mounted flexible hinge portion at one end and a projecting web portion at the opposite end, and a separate looped link cooperating with the projecting web at one end of the contact arm and with the projecting portion of said second spacer for movement of the contact arm with the active elements in one direction and for movement of the active elements free of the contact arm in the opposite direction.

9. In a thermostat, in combination, active thermostat elements having different coefficients of expansion and hinged by fixedly mounted integral flexible hinge portions for movement in opposite directions by differential elongation and shortening of the elements upon a rise and drop in temperature, a first contact, a contact arm carrying a second contact, said contact arm being hinged by a fixedly mounted flexible hinge portion and connected to said active element for movement with said elements in a direction to separate said second contact from said first contact, cooperating magnetic members comprising a magnet and an armature one carried by said contact arm and the other supported adjacent to said first contact, and adjusting and calibrating means for adjusting one of said magnetic members relative to the other magnetic member and one of said contacts relative to the other contact, one of said cooperating magnetic members being of ring-shaped form surrounding and shielding said first contact.

10. In a thermostat, in combination, active thermostat elements having different coefficients of expansion and hinged by fixedly mounted integral flexible hinge portions for movement in opposite directions by differential elongation and shortening of the elements upon a rise and drop in temperature, a first contact, a contact arm carrying a second contact, said contact arm being hinged by a fixedly mounted flexible hinge portion and connected to said active elements for movement with said elements in a direction to separate said second contact from said first contact, cooperating magnetic members comprising a magnet and an armature one carried by said contact arm and the other supported adjacent to said first contact, and adjusting and calibrating means for adjusting one of said magnetic members relative to the other magnetic member and one of said contacts relative to the other contact, the first contact being carried by a screw and the magnetic member adjacent to the first contact being carried by a member having screwed engagement with said screw.

11. In a thermostat, in combination, active thermostat elements having different coefficients of expansion and hinged by fixedly mounted integral flexible hinge portions for movement in opposite directions by differential elongation and shortening of the elements upon a rise and drop in temperature, a first contact, a contact arm carrying a second contact, said contact arm being hinged by a fixedly mounted flexible hinge portion and connected to said active elements for movement with said elements in a direction to separate said second contact from said first contact, cooperating magnetic members comprising a magnet and an armature one carried by said contact arm and the other supported adjacent to said first contact, and adjusting and calibrating means for adjusting one of said magnetic members relative to the other magnetic member and one of said contacts relative to the other contact, the first contact being carried by a screw and the magnetic member adjacent the first contact being carried by a member having screwed engagement with said screw, the magnetic member adjacent to the first contact being of ring-shaped form surrounding and shielding the first contact.

12. In a thermostat, in combination, a base, active thermostat elements having different coefficients of expansion and hinged on said base for movement in opposite directions by differential elongation and shortening of the elements upon a rise and drop in temperature, a substantially unitary screw carrying a first contact and having spaced threaded portions one in screwed engagement with a first hub member mounted on said base and the other threaded portion in screwed engagement with a second hub member, a rotatable plate splined to said screw between said threaded portions, an adjusting dial engaged with said second hub member for rotation of the second hub member with said dial, a member carried by said rotatable plate for frictional engagement with said dial, and a contact arm hinged on said base and carrying a second contact, said contact arm being connected to said active elements for movement with said active elements in a direction to separate said second contact from said first contact.

13. A thermostat according to claim 12 wherein the member carried by the rotatable plate for frictional engagement with the dial comprises a screw extending through an arcuate slot in the dial.

14. A thermostat according to claim 12 wherein there is a magnet carried by and adjustable with the second hub member, and a cooperating armature carried by the contact arm.

15. A thermostat according to claim 12 wherein there is a ring-shaped magnet carried by the second hub member and surrounding the first contact, said magnet being adjustable with said second hub member, and a cooperating armature carried by the contact arm.

16. A thermostat according to claim 12 wherein there is releasable means carried by the base and cooperable with stop means on the dial to stop turning movement of the dial.

17. A thermostat according to claim 12 wherein the active thermostat elements have beam sections for stiffening same.

18. In a thermostat, in combination, a base, a substantially unitary screw carrying a first contact and having spaced threaded portions one in screwed engagement with a first hub member mounted on said base and the other threaded portion in screwed engagement with a second hub member, a rotatable member operatively coacting with said screw to turn said screw by rotation of said member, an adjusting member engaged with said second hub member for rotation of said second hub member with said adjusting member, a connecting member carried by said rotatable member for frictional engagement with said adjusting member, and a second contact cooperable with said first contact.

19. A thermostat according to claim 18 wherein there is a magnet and cooperating armature one carried by the hub member and the other carried by the contact arm.

20. In a thermostat, in combination, a base, a substantially unitary screw carrying a first contact and having spaced threaded portions one in screwed engagement with a first hub member mounted on said base and the other threaded portion in screwed engagement with a second hub member, a rotatable plate splined to said screw between said threaded portions, an adjusting dial engaged with said second hub member for rotation of the second hub member with said dial, a member carried by said rotatable plate for frictional engagement with said dial, and a contact arm hinged on said base and carrying a second contact cooperable with said first contact.

21. In a thermostat, in combination, active thermostat elements having different coefficients of expansion and hinged for movement by differential changes in length of the elements upon a change in temperature, a first contact, a contact arm carrying a second contact, said contact arm being pivotally mounted and connected to said active elements for movement therewith to separate said first and second contacts, cooperating magnetic members comprising a magnet and an armature one carried by said contact arm and the other supported adjacent said first contact, and adjusting and calibrated means for adjusting one of said magnetic members relative to the other of said magnetic members and one of said contacts relative to the other of said contacts, one of said cooperating magnetic members being of ring-shaped form surrounding and shielding said first contact.

22. In a thermostat, in combination, a base, active thermostat elements having different coefficients of expansion mounted relative to said base for movement by differential changes in length of the elements upon a change in temperature, a screw carrying a first contact and formed with threads in engagement with a first hub member mounted relative to said base, a first hub member threadedly mounted on said screw, a plate non-rotatably mounted on said screw, an adjusting dial non-rotatably mounted on said second hub member for rotation of said second hub member with said dial, means in cooperation with said plate and said dial to prevent substantial rotational movement therebetween, and a contact arm pivotally mounted relative to said base and carrying a second contact, said contact arm having connection with said active elements for movement therewith to effect separation of said first and second contacts.

23. A thermostat, comprising, a pair of active elements having different coefficients of expansion and each of beam section with side flanges and a connecting web, the connecting web of said elements projecting beyond the ends of the side flanges at one end of the thermostat to form fixedly mounted flexible hinge portions about which said elements are swingable in opposite directions, and the connecting webs of said elements having creases extending longitudinally between said side flanges and terminating at the flexible hinge portions of said webs.

24. A thermostat, comprising, a pair of active elements having different coefficients of expansion and each of beam section with side flanges and a connecting web, the connecting webs of said elements projecting beyond the ends of the side flanges at one end of the thermostat to form fixedly mounted flexible hinge portions about which said elements are swingable in opposite directions, the connecting webs of said elements having creases extending longitudinally between said side flanges and terminating at the flexible hinge portions of said webs, a contact arm hinged by a flexible hinge portion, and a looped link cooperating with said active elements and said contact arm for moving the contact arm with the active elements in one direction and permitting movement of the active elements free of the contact arm in the opposite direction.

25. A thermostat according to claim 24 wherein the contact arm has its contact carrying portion shaped as a beam section.

References Cited in the file of this patent

UNITED STATES PATENTS

| Number | Name | Date |
|---|---|---|
| 873,511 | Cyphers | Dec. 10, 1907 |
| 1,116,534 | Baker | Nov. 10, 1914 |
| 2,026,866 | Chadwick | Jan. 7, 1936 |
| 2,204,791 | Davis | June 18, 1940 |
| 2,255,021 | Dillman | Sept. 2, 1941 |
| 2,413,100 | Crise | Dec. 24, 1946 |
| 2,417,911 | Carlson | Mar. 25, 1947 |
| 2,420,078 | Higley | May 6, 1947 |
| 2,455,306 | Higley | Nov. 30, 1948 |
| 2,472,638 | White | June 7, 1949 |
| 2,493,294 | Kronmiller | Jan. 3, 1950 |